United States Patent
Needham et al.

[15] 3,694,543

[45] Sept. 26, 1972

[54] REPELLENT COMPOSITION

[72] Inventors: Donald G. Needham, Ramona; Howard B. Walker, Bartlesville; Luther O. Myers, Jr., Pawhuska, all of Okla.

[73] Assignee: Phillips Petroleum Company

[22] Filed: Jan. 4, 1971

[21] Appl. No.: 103,889

[52] U.S. Cl. ................................................. 424/30
[51] Int. Cl. ................................................ A01n 17/00
[58] Field of Search ..................................... 424/30

[56] References Cited

UNITED STATES PATENTS

| | | | |
|---|---|---|---|
| 3,426,133 | 2/1969 | Shotton | 424/30 |
| 3,269,902 | 8/1966 | Goodhue et al. | 424/30 |
| 3,252,858 | 5/1966 | Goodhue | 424/30 |
| 2,941,879 | 6/1960 | Goodhue | 71/2.7 |
| 2,862,850 | 12/1958 | Goodhue | 424/30 |
| 2,704,246 | 3/1955 | Goodhue et al. | 71/2.7 |
| 2,621,143 | 12/1952 | Goodhue et al. | 424/30 |

*Primary Examiner*—Shep K. Rose
*Attorney*—Young and Quigg

[57] ABSTRACT

Repellent compositions comprising blends of a repellent in copolymers of ethylene and a 1-olefin containing four to six carbon atoms per molecule. Stable repellent concentrate compositions containing up to 20 weight per cent repellent can be prepared.

18 Claims, No Drawings

REPELLENT COMPOSITION

This invention relates to repellent compositions and methods for preparing same.

The protection of food products, grains, plants, buried materials such as cables, and other substances, against attack and/or destruction by rodents, insects, and other pests is a problem of major significance. Great damage and/or loss is incurred by rodents consuming stored food products and grains. Rodents also gnaw through the insulation of buried electrical and telephone cables causing damage and interruption of service. Insects cause loss of food products, etc., by infesting the same.

Various materials are known and used as repellents in protecting the above-described materials. For example, the N,N-dimethylsulfenyldithio-carbamates are known to be excellent repellents for rodents, insects, and other pests. See U.S. Pats. Nos. 2,621,143 and 2,862,850. Dodecylamine acetate and dodecyl alcohol are two other know repellents. See U.S. Pats. Nos. 2,822,295 and 2,822,296. Still other known repellents include the polycyclic halogenated compounds disclosed in U.S. Pat. No. 2,717,851.

A problem associated with the use of practically all repellent materials is the application of the repellent to the site or article to be protected. Carriers or repellent adjuvants are commonly employed to facilitate the use of said repellents. We are aware that various plastics have been proposed as carriers for repellents. For example, repellents have been incorporated in plastics used for insulating electrical cables, and in plastic sheeting or film used in forming packages for food products. However, there are problems associated with the use of plastics. In many instances, the repellent materials are difficult to incorporate into or are not compatible with the plastic material. Frequently, the repellent material cannot be incorporated in the plastic in sufficient concentrations, or after incorporation the resulting composition is not stable. These difficulties are evidenced during blending and/or pelletizing of the blended material. In such instances, the repellent can be blended into the plastic only with great difficulty, or after blending the resulting blend cannot be extruded into the pellet form in which plastic materials are commonly sold commercially for subsequent use in manufacturing operations. It sometimes happens that even after apparently successful blending and pelletizing, the resulting composition will not be stable. Instability is evidenced by bleeding or exudation of the repellent from the plastic, or by odor. These problems are particularly troublesome when it is desired to prepare concentrated repellent compositions which are later let down by the manufacturer in preparing the finished articles.

The present invention provides a solution for the above difficulties. We have now discovered that copolymers of ethylene with 1-olefins containing from four to six carbon atoms per molecule, and having a density within the range of 0.910 to 0.930 are excellent carriers for repellent materials. SAid copolymers can be used to prepare easily prepared, stable, repellent compositions containing a wide range of repellent concentrations ranging from small but effective amounts sufficient to repel the pest in question, up to large amounts such as are used in preparing concentrates for subsequent letdown.

Thus, according to the invention, there is provided a repellent composition, effective for repelling rodents, insects, or other pests, comprising: a minor proportion of a repellent, said minor proportion being at least an amount which is sufficient to effectively repel said pests from a place or article to which said composition has been applied; and as a carrier for said repellent, a major proportion of a copolymer of ethylene and a 1-olefin having from 4 to 6 carbon atoms, said copolymer containing from 4 to 10 weight per cent of said olefin and having a density within the range of from 0.910 to 0.930.

The copolymers used in the practice of the invention are copolymers of ethylene and 1-olefins having from 4 to 6 carbon atoms per molecule, and are characterized by having a density within the range of 0.910 to 0.930, preferably at least 0.920. The preferred copolymers are characterized by having from 4 to 10, preferably 5 to 9, weight per cent of said 1-olefin incorporated therein. Said copolymers are further characterized by freedom from surface stickiness and an environmental stress cracking resistance ($F_{50}$) of greater than 100. The more preferred copolymers have from 14 to 21 ethyl branches per 1,000 carbon atoms. Said copolymers will preferably contain from 0.5 to 0.7 vinyl groups per 1,000 carbon atoms. The ratio of weight average to number average molecular weight of said copolymers is preferably within the range of from 6 to 20. Preferably, said copolymers will have a melt index within the range of 0.1 to 5.0 (ASTM D 1238-65T). In some instances, a melt index below 0.5 is preferred.

One feature distinguishing the copolymers used in the practice of the invention from low density polyethylene is that said copolymers contain ethyl branches as distinguished from long chain branches (measured as butyl or longer), and also by the presence of substantial vinyl unsaturation.

The copolymers used in the practice of the invention are distinguished over previously known ethylene-1-olefin copolymers by their density and molecular weight distribution, i.e., the ratio of weight average to number average molecular weight. The environmental stress cracking resistance of the copolymers of the invention is significantly greater than that of previously known ethylene-1-olefin copolymers. Moreover, as further distinguished from other ethylene-1-olefin copolymers, the copolymers used in the practice of the invention are free from bleeding and surface stickiness, and do not have a "cheesy" feel.

The following table sets forth a comparison of the properties of typical copolymers which can be used in the practice of this invention, e.g., Copolymer A and Copolymer B, with the properties of commercial low density polyethylene and the properties of a copolymer such as that described in U.S. Pat. No. 3,102,876, which is designated "Copolymer Control."

TABLE

|  | Copolymer A | Copolymer B | Commercial Low Density Polyethylene | Copolymer Control |
|---|---|---|---|---|
| Density | 0.9255 | 0.9237 | 0.927 | >0.93 |
| Melt Index | 0.13 | 0.10 | 0.15 | 2.0 |
| Weight Average | 213,000 |  | 165,000 | 259,000 |

| | | | |
|---|---|---|---|
| Molecular Weight Number Average | 17,700 | 27,600 | 7,900 |
| Molecular Weight Ratio, Weight Av. to Number Average Molecular Weight | 12.0 | 6.0 | 33.0 |
| Elongation, % | 360 | 565 | 73 |
| Tensile, Strength at Yield, Pounds per Square Inch | 1800 | 2100 | 1980 |
| Flexural Modulus, Pounds per Square Inch | 69,000 | 60,000 | 75,000 |
| Hardness | 55 | 58 | 56 |
| Long chain branches (Butyl or longer) per Thousand Carbon Atoms | – | – | 22 |
| Ethyl Branches per Thousand Carbon Atoms | 16 | 16 | – |
| Trans Internal Unsaturation Groups per Thousand Carbon Atoms | 0.1 | 0.1 | <0.1 |
| Vinyl Unsaturation, Groups per Thousand Carbon Atoms | 0.6 | 0.6 | <0.1 |
| Branched Vinyl Unsaturation, Groups per Thousand Carbon Atoms | 0.2 | 0.1 | 0.2 |
| Environmental Stress Cracking Resistance, Hours ($F_{50}$) | >1000 | >1000 | 65 | <20 |
| | Not cheesy—no bleeding | | Cheesy-Considerable bleeding |

The data in the above table show that the stress cracking resistance of the copolymers used in the practice of the invention is over 50 times greater than that of the copolymer control, and many times greater than that of the commercial low density polyethylene. No bleeding or surface stickiness was indicated for the copolymers by an oven-aging test at 140° F., whereas considerable bleeding occurred with the copolymer control. Thus, the copolymers of the invention are characterized by freedom from surface stickiness.

Comparing Copolymer A and Copolymer B with the commercial low density polyethylene shows that said copolymers are characterized by substantial ethyl branching and vinyl unsaturation whereas the low density polyethylenes have great numbers of long chain branches and substantially no vinyl unsaturation. Comparing said Copolymer A and said Copolymer B with the copolymer control shows that said Copolymers A and B have lower density and are characterized by a significantly lower ratio of weight average molecular weight to number average molecular weight.

In the above data, density was determined by a gradient column upon specimens which had been molded at a temperature slightly higher than the melting point and then were cooled at a rate of 14° F. per minute (ASTM D 1505–63T). Molecular weight distribution is indicated by the ratio of the weight average molecular weight to the number average molecular weight. A high value for this ratio is indicative of a broad molecular weight distribution. Both weight average and number average molecular weight were determined by gel permeation chromatography (GPC), as described by J.C. Moore, J. Polymer Science, Part A, Volume 2, pages 835–843 (1964). Calibration of the GPC method was by membrane osmometry (for number average molecular weight) and light scattering (for weight average molecular weight). Tensile properties were determined by ASTM D 638-61T upon specimens which were compression molded at a temperature slightly above the melting point and cooled at a rate of 25°±5° F. per minute. The rate of draw was 20 inches per minute. Flexural modulus was determined by ASTM D 790-63. The hardness was determined by ASTM D 1706-61. Environmental stress cracking was determined by ASTM D 1693-66. Ethyl branching was indicated by an infrared absorption band at 13 microns while long chain branches were indicated by absorption at 11.2 microns, after bromination to remove the interfering unsaturation band at 11.25 microns. Methyl groups these branches were quantitatively measured at 7.25 microns utilizing a differential technique. Unsaturation was determined by measuring the characteristic bands at 10.35, 11.0, and 11.27 microns, the films being subsequently brominated to determine the amount of spectral interference.

Copolymer A was prepared by impregnating microspheroidal silica with chromium oxide and activating the catalyst for 5 hours at 1,400° F. The catalyst contained 1.9 weight per cent chromium trioxide. Ethylene feed containing 11 percent 1-butene was contacted with the catalyst in the presence of isobutane diluent for 90 minutes at a temperature of 192° F. and a pressure of 330 pounds per square inch gage. The productivity was 2,150 pounds of polymer per pound of catalyst and the copolymer contained about 5 per cent incorporated butene-1. 0.02 Mol of hydrogen per mol of ethylene was charged to the reaction along with the feed.

Copolymer B was made by impregnating microspheroidal silica-alumina (88 weight per cent silica, 12 weight per cent alumina) with chromium oxide and activating for 5 hours at 1,400° F. The resulting catalyst contained 2 weight per cent chromium trioxide. Ethylene feed containing 19 weight percent butene-1 was contacted with the catalyst in the presence of isobutane diluent for 90 minutes at a temperature of 200° F. and a pressure of 450 pounds per square inch gage. The productivity was 1,900 pounds of polymer per pound of catalyst, and the copolymer contained about 5 per cent incorporated butene-1.

Thus, in one method for preparing copolymers which can be used in the practice of the invention, the catalyst can be chromium oxide on a porous support containing from about 1.5 to 2.5 weight per cent chromium trioxide which has been activated for about 4 to 15 hours at a temperature of 1,250° to 1,650° F. The feedstock can comprise ethylene containing a 1-olefin (having from 4 to 6 carbon atoms) in an ethylene to 1-olefin weight ratio within the range of 8:1 to 15:1. Said feedstock can be contacted with said catalyst at a temperature within the range of 160° to 225°, preferably 180° to 210, °F., and a pressure within the range of 250 to 700, preferably 300 to 600, psig. Said catalyst can be employed in any suitable amount but will usually be present in reaction zone in an amount within the range of about 0.5 to about 1 weight per cent of the feedstock. Said contacting is preferably carried out in the presence of a suitable hydrocarbon diluent, e.g., isobutane, pentanes, hexanes, etc.

The Copolymer Control was prepared by impregnating silica-alumina (88 weight per cent silica, 12 weight per cent alumina) with chromium trioxide and activating for 5 hours at 950° F. The resulting catalyst contained 2.6 weight per cent chromium. The catalyst was contacted with ethylene feed containing 13 weight per cent butene-1 for 120 minutes at a temperature of 250° F. and a pressure of 250 pounds per square inch gage in cyclohexane solvent. The productivity was 418 pounds of polymer per pound of catalyst and the polymer contained about 5.5 per cent of incorporated butene-1.

The copolymers used in the practice of the invention are preferably used in granular porous form essentially as recovered from the reactor effluent. Said copolymers as recovered and prior to pelleting have a typical bulk density within the range of 18 to 24 pounds per cubic foot. Commonly, the bulk density will be in the range of 20 to 22 pounds per cubic foot. Typical screen analyses show that about 90 to 99 weight per cent of the granular porous copolymers will have a particle size within the range of 10 to 60 mesh, U. S. Standard series. However, it is within the scope of the invention to first pellet the copolymer in conventional manner and then incorporate the repellent in the copolymer.

Any suitable repellent can be used in preparing the repellent compositions of the invention. The above-mentioned N,N-dimethylsulfenyldithio-carbamates are presently preferred repellents for use in the practice of the invention. One method for the preparation of said dithiocarbamates comprises reacting an alkali metal salt of an N-substituted dithiocarbamate with an aliphatic sulfenylthiocyanate. See U. S. Pat. No. 2,390,713. Another method for the preparation of said dithiocarbamates comprises reacting a lower alkyl sulfenyl halide with salts of N-substituted dithiocarbamic acid in aqueous solution as disclosed and claimed in U. S. Pat. No. 2,792,394. This latter method of preparation is a presently preferred method. Specific dithiocarbamates which can be used in the practice of the invention include N,N-dimethyl-S-methylsulfenyldithiocarbamate and N,N-dimethyl-S-tert-butylsulfenyldithiocarbamate.

The amount of repellent incorporated into said copolymers can vary over a wide range, depending upon the effectiveness of the repellent and the final use to be made of the resulting composition. Repellents and repellent compositions are usually applied to a site or article to be protected in a small amount which is sufficient to effectively repel the rodent, insect, or other pest from which protection is desired. When the compositions of the invention are to be applied directly to the site or article to be protected, the amount of repellent incorporated into the copolymer can vary from 0.05 to 2 or 3 weight per cent of the composition.

Because of the large amount of repellent which can be incorporated therein, the copolymers used in the practice of the invention are particularly useful in preparing repellent concentrates. Said concentrates can contain any suitable amount, e.g., at least about 5, preferably at least about 10, more preferably at least about 20, per cent by weight, or more, of repellent. The resulting concentrate composition can then be let down to the desired final concentration in the finished article during the manufacture of said article. Said concentrates are thus particularly useful to manufacturers making a variety of articles wherein it is desirable to incorporate different amounts of repellent.

Thus, the overall range for the amount of repellent in the repellent compositions of the invention can vary from 0.05 to at least about 20 weight per cent, or more, with the above-described concentrate compositions being preferred because of their greater utility. As shown by the examples given below, the copolymers of the invention are outstanding in their usefulness for preparing the repellent concentrates of the invention. It was surprising and unexpected that said copolymers could be used to incorporate the large amounts of repellent shown in said examples.

The following examples will serve to further illustrate the invention.

EXAMPLE I

An ethylene-butene-1 copolymer was prepared by impregnating micro-spheroidal silica-alumina (88 weight per cent silica, 12 weight per cent alumina) with chromium oxide and activating for about 5 hours at 1,400° F. The resulting catalyst contained about 2 weight per cent chromium trioxide. An ethylene feed containing 13 weight per cent butene-1 was contacted with said catalyst in the presence of isobutane diluent at a temperature of about 184° F. and a pressure of about 530 psig. The reaction was carried out in a continuous fashion in a loop reactor. The copolymer product in particle granular form and containing about 8 weight per cent of incorporated butene-1 was continuously withdrawn from the reactor during the reaction. After recovery from the isobutane diluent the copolymer product was found to have a density of 0.924 and a melt index of 0.11.

The copolymer product was then used to prepare a series of blends containing 5, 10 and 20 weight per cent of N,N-dimethyl-S-tert-butylsulfenyldithiocarbamate. In preparing said blends, the copolymer was placed in a Henschel-type blender first and the temperature increased to about 60° C. The desired amount of said repellent was then added to the blender and incorporated into the polymer by blending for approximately 2 to 4 minutes until a homogeneous blend was obtained.

The resulting blend was discharged from the blender and pelletized at a temperature of 300° to 350° F. in conventional manner employing a compounding extruder. Upon examination, none of the pellets from any of the blends showed any evidence of exudation or bleeding of repellent therefrom. Furthermore, the odor level of the finished pellets was low and completely acceptable. Examination of the finished pellets after standing for 48 hours still showed no evidence of bleeding or exudation. Examination of other blends prepared in essentially the same manner, after cool and dry storage in a closed container for longer periods of time, showed that said blends were completely stable.

EXAMPLE II

A high density ethylene homopolymer was prepared in essentially the same manner as the copolymer of Example I. Essentially the only difference in the preparation was the omission of the butene-1 from the feedstock. The resulting homopolymer had a density of 0.959 and a melt index of 0.3.

Said homopolymer was then used to prepare two blends containing 5 and 10 weight per cent of N,N-dimethyl-S-tert-butylsulfenyldithiocarbamate using the Henschel-type blender in essentially the same manner as described in Example I.

Attempts were then made to pelletize the resulting blends. Due to the properties of the polymer it was necessary to operate the pelleting extruder at temperatures of 400° to 450° F. At this temperature the blend containing 10 weight per cent of the dithiocarbamate repellent could not be pelletized because the repellent separated and flowed from the extruder in a liquid stream. Difficulties were also encountered in pelletizing the 5 per cent blend for the same reason, although some repellent was retained in and on the surface of the pellets. The repellent odor was strong during the pelletizing operation, indicating loss of repellent.

EXAMPLE III

Blends of a commercial low density polyethylene homopolymer containing 5 and 10 weight per cent of N,N-dimethyl-S-tert-butylsulfenyldithiocarbamate were prepared. The commercial polyethylene was in pellet form and had a density of 0.917 and a melt index of 7.1. The polyethylene pellets and the repellent were dry blended by tumbling together.

Attempts were then made to pelletize the resulting blends at temperatures of 300° to 350° F. in a compounding extruder. The 5 per cent blend was pelletized. However, upon standing for 48 hours the repellent extruded to the surface of the pellets. The odor of the pelletized composition was strong and unsatisfactory. The 10 weight per cent blend could not be pelletized due to the lubricating action of the dithiocarbamate. This resulted in surging and irregular feed to the pelletizer.

EXAMPLE IV

Another series of blends, essentially like the blends in Example III, was made using another commercial low density polyethylene having a density of 0.913 and a melt index of 200. When attempts were made to pelletize the results were unsatisfactory for the same reasons as in Example III.

The runs of the above Example I demonstrate that stable repellent compositions containing a wide range of active repellent ingredient can be prepared when using the copolymers described herein as being useful in the practice of the invention. When said compositions contain small amounts of active repellent ingredient, e.g., 0.05 to 2 or 3 weight per cent, they can be used directly for the manufacture of pipe, bagging and detergent packaging materials, wire coatings and other heavy duty applications. When said compositions contain larger amounts of active repellent ingredient, e.g., 5, 10, and 20 weight per cent, they can be used as concentrates and let down to the desired concentration during manufacture of the above-described articles or materials. The repellent compositions of the invention can be used in either the granular form or in the pelleted form.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A repellent composition, effective for repelling rodents, insects, or other pests, comprising:
    a minor proportion of a repellent, said minor proportion being at least an amount which is sufficient to effectively repel said pests from a place or article to which said composition has been applied; and
    as a carrier for said repellent, a major proportion of a copolymer of ethylene and a 1-olefin having from four to six carbon atoms, said copolymer containing from 4 to 10 weight per cent of said olefin and having a density within the range of from 0.910 to 0.930.

2. A composition according to claim 1 wherein said copolymer is further characterized by having from 14 to 21 ethyl branches per 1,000 carbon atoms, a ratio of weight average to number average molecular weight within the range of from 6 to 20, and an environmental stress cracking resistance ($F_{50}$) of greater than 100.

3. A composition according to claim 2 wherein said copolymer is further characterized by having a melt index below 0.5, and from 0.5 to 0.7 vinyl groups per 1,000 carbon atoms.

4. A composition according to claim 1 wherein said repellent is present in said composition in an amount of up to at least about 20 weight per cent.

5. A composition according to claim 4 wherein said repellent is present in said composition in an amount of at least about 10 weight per cent.

6. A composition according to claim 4 wherein said repellent is present in said composition in an amount of at least about 5 weight per cent.

7. A composition according to claim 4 wherein said repellent is an N,N-dimethylsulfenyldithiocarbamate.

8. A composition according to claim 7 wherein said dithiocarbamate is N,N-dimethyl-S-methylsulfenyl-dithiocarbamate.

9. A composition according to claim 7 wherein said dithiocarbamate is N,N-dimethyl-S-tert-butylsulfenyl-dithiocarbamate.

10. A method for repelling rodents, insects, or other pests, which method comprises applying to the place or material to be protected a repelling amount of a composition according to claim 1.

11. A process for preparing a repellent composition, which process comprises:
    blending a minor proportion of a repellent into a major proportion of a porous granular copolymer of ethylene and a 1-olefin having from four to six carbon atoms per molecule, said copolymer having from 4 to 10 weight per cent of said olefin incorporated therein and having a density within the range of from 0.910 to 0.930.

12. A process according to claim 11 wherein said copolymer has a bulk density within the range of from 18 to 24 pounds per cubic foot, and a particle size within the range of from 10 to 60 mesh.

13. A process according to claim 11 wherein the resulting blend is subsequently pelletized.

14. A process according to claim 11 wherein said repellent is present in said composition in an amount of up to at least about 20 weight per cent.

15. A composition according to claim 1 wherein:
said 1-olefin is butene-1;
said repellent is N,N-dimethyl-S-methylsulfenyl-dithiocarbamate; and
said repellent is present in said composition in an amount within the range of from 0.05 to at least about 20 weight per cent.

16. A composition according to claim 1 wherein:
said 1-olefin is butene-1;
said repellent is N,N-dimethyl-S-tert-butylsulfenyl-dithiocarbamate; and
said repellent is present in said composition in an amount within the range of from 0.05 to at least about 20 weight per cent.

17. A process according to claim 11 wherein:
said 1-olefin is butene-1;
said repellent is N,N-dimethyl-s-methylsulfenyl-dithiocarbamite; and
said repellent is present in said composition in an amount within the range of from 0.05 to at least about 20 weight per cent.

18. A process according to claim 11 wherein:
said 1-olefin is butene-1;
said repellent is N,N-dimethyl-S-tert-butylsulfenyl-dithiocarbamate; and
said repellent is present in said composition in an amount within the range of from 0.05 to at least about 20 weight per cent.

* * * * *